United States Patent [19]

Weagraff

[11] Patent Number: 5,449,146
[45] Date of Patent: Sep. 12, 1995

[54] GATE VALVE FOR PARTICULATE MATERIALS

[75] Inventor: Jon J. Weagraff, Titusville, Pa.

[73] Assignee: The Conair Group, Inc., Pittsburgh, Pa.

[21] Appl. No.: 335,159

[22] Filed: Nov. 7, 1994

[51] Int. Cl.6 .............................................. F16K 3/00
[52] U.S. Cl. ...................... 251/326; 251/329
[58] Field of Search .............................. 251/326, 329

[56] References Cited

U.S. PATENT DOCUMENTS

| | | | |
|---|---|---|---|
| 1,295,540 | 2/1919 | McCaig et al. | |
| 1,753,524 | 4/1930 | Mawly | 251/326 X |
| 2,077,980 | 4/1937 | Bell | 83/18 |
| 2,207,120 | 7/1940 | Greig | 221/104 |
| 2,505,697 | 4/1950 | Vomacka | 222/361 |
| 2,851,051 | 9/1958 | Erylert et al. | 251/329 X |
| 2,852,167 | 9/1958 | Lempart | 222/354 |
| 2,983,408 | 5/1961 | Schwartz | 222/284 |
| 3,581,954 | 6/1971 | Prentice | 222/368 |
| 3,623,639 | 11/1971 | McShirley | 222/108 |
| 4,531,658 | 7/1985 | Galopin | 222/181 |
| 5,082,247 | 1/1992 | Owens et al. | 251/326 |

*Primary Examiner*—John C. Fox
*Attorney, Agent, or Firm*—Buchanan Ingersoll; George Raynovich, Jr.

[57] ABSTRACT

A reciprocating gate valve for controlling the flow of particulate material is provided. The gate valve has a metal valve gate with an angled leading edge and also has a groove in the center of the angled leading edge. The valve body is formed from a metal cover plate that has a plurality of plastic body parts fixed to the cover plate so that the metal valve gate reciprocates between plastic body parts. The plastic body parts are preferably formed of self-lubricating plastic such as nylon or Teflon. The valve body has a rectangular recess which intersects the circular passage through the valve body with the rectangular recess having its long dimension positioned transverse to the direction of movement of the valve gate. The rectangular recess provides space for the particulate material to be moved ahead of the valve gate angled leading edge as the valve gate closes. The notch in the angled leading edge of the valve gate can sever any isolated piece of particulate material that is in a position to block the complete closure of the valve gate.

10 Claims, 6 Drawing Sheets

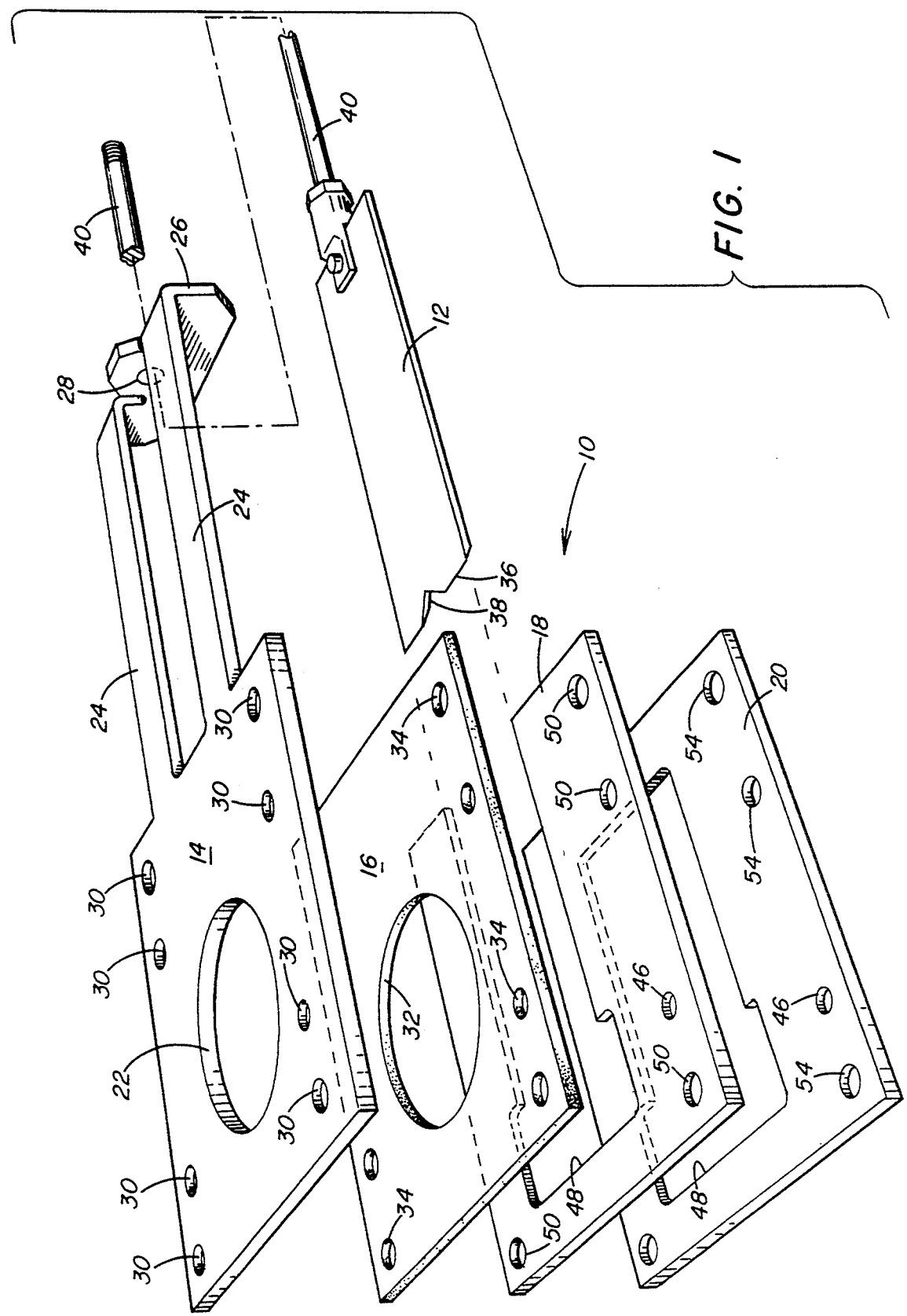

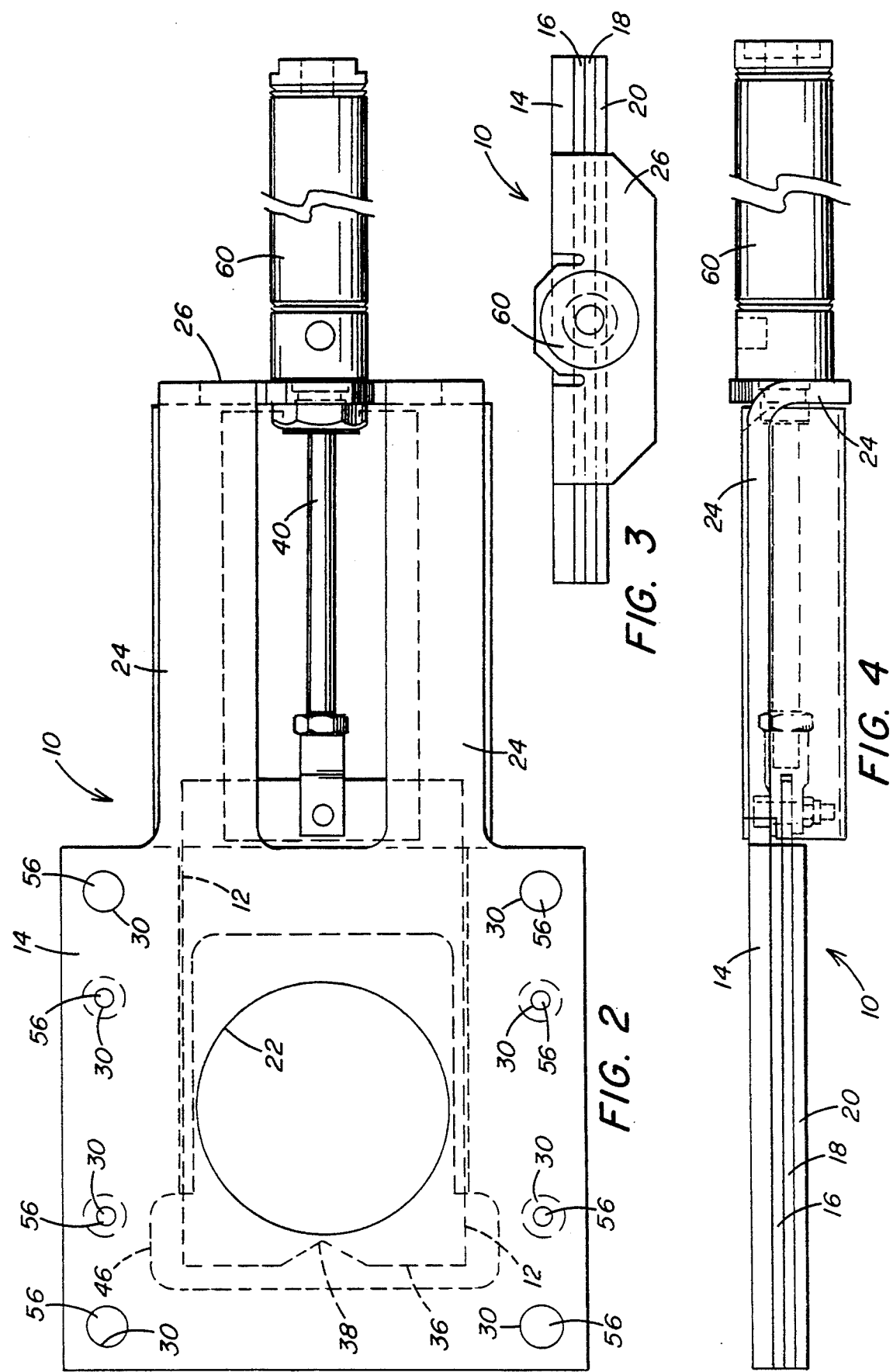

GATE VALVE FOR PARTICULATE MATERIALS

BACKGROUND OF THE INVENTION

1. Field of the Invention

This invention relates to a gate valve for controlling the flow of particulate material from a vessel or in a pipeline and more particularly to controlling the flow of plastic pellets with a valve that also seals an air line or a vacuum line.

2. Description of the Prior Art

Gate valves have been utilized to control the flow of particulate material by having a gate that opens and closes to permit material to flow through the valve when the valve gate is open. With particulate material, difficulties have been encountered in closing the gate securely since particulate material can jam between the end of the gate and the passage through which the material passes to keep the gate from completely closing. Under such conditions, the valve does not seal the air line or vacuum line in which it is utilized.

Some examples of earlier designs for valves that control particulate material may be found in the following patents: U.S. Pat. Nos. 1,295,540; 2,077,980; 2,207,120; 2,505,697; 2,852,167; 2,983,408; 3,581,954; 3,623,639; and 4,531,658.

The present invention is directed to a gate valve which effectively controls the flow of particulate material, particularly plastic pellets, through the gate valve. The present invention has a valve gate with an angled leading edge and a notch formed in it to permit the valve gate to push away particulate material that may prevent it from completely closing. The body of the valve of the present invention has a recessed portion adjacent the circular passage through the valve so that there is a space for particulate material which may jam in the valve body to be moved out of the way by the valve gate.

SUMMARY OF THE INVENTION

In accordance with the present invention, there is provided a gate valve for controlling the flow of particulate material which includes a valve body formed from a cover plate and body members fixed to the cover plate. The valve body has a circular passage formed through it. A valve gate is slidable within the valve body between an open position where the circular passage permits movement of particulate material through the valve and a closed position where the valve gate closes the circular passage. The valve gate is rectangular and has an angled leading edge with a notch formed at the center of the leading edge. A valve actuator is secured to the valve gate and is operable to reciprocate the valve gate within the valve body between the open position and the closed position.

Further in accordance with the presence invention, there is provided a gate valve for controlling the flow of plastic pellets through the gate valve which includes a valve body. The valve body is formed from a metal cover plate with a plurality of self-lubricating plastic body members attached to the metal cover plate. The valve body has a circular passage formed through it. A rectangular valve gate is slidable within the valve body between an open position where the circular passage permits movement of pellets through the gate valve and a closed position where the valve gate closes the circular passage. The valve gate has an angled leading edge with a notch formed at the center of the leading edge. The valve body has an enlarged rectangular recess abutting the circular passage with the longer dimension of the rectangular recess transverse to the direction of movement of the valve gate. The enlarged rectangular recess is adapted to receive plastic pellets displaced by the valve gate as the valve gate moves to the closed position. A valve actuator is secured to the rectangular valve gate and to the valve body and is operable to reciprocate the valve gate within the valve body between the open position and the closed position.

Accordingly, a principal object of the present invention is to provide an efficient gate valve for controlling the flow of particulate material.

Another object of the present invention is to provide a gate valve for controlling the flow of plastic pellets from a containment vessel by gravity by having the gate valve disposed horizontally below the containment vessel.

Another object of the present invention is to provide a gate valve that has a valve gate with an angled leading edge that is notched so that the valve gate can move particulate material that might keep it from closing completely and sever in the notch any last piece of particulate material that may prevent complete valve closure.

These and other objects of the present invention will be more completely disclosed and described in the following specification, the accompanying drawings and the appended claims.

BRIEF DESCRIPTION OF THE DRAWINGS

FIG. 1 is an exploded perspective view of the gate valve of the present invention showing the various parts of the valve.

FIG. 2 is a top plan view of the gate valve of the present invention.

FIG. 3 is an end view of the gate valve.

FIG. 4 is a side elevation of the gate valve.

DESCRIPTION OF THE PREFERRED EMBODIMENT

Figure 5:
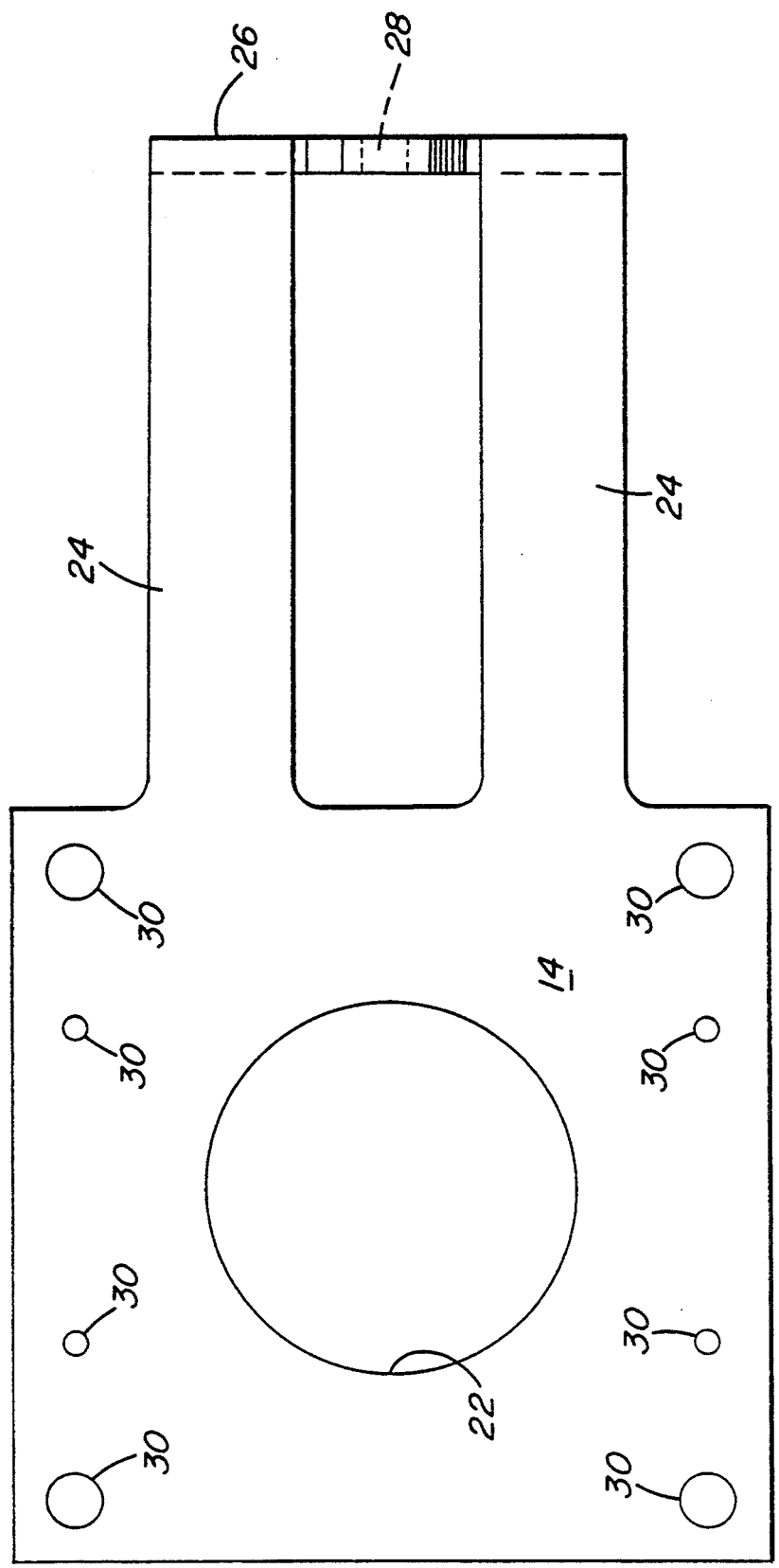
FIG. 5 is a top plan view of the metal cover plate of the valve body.

Referring to the drawings, and particularly to FIGS. 1–4, there is shown a gate valve 10 having a valve gate 12 that reciprocates within the valve body. The valve body includes a metal body cover plate 14, a plastic body part 16 positioned immediately below cover plate 14, another plastic body part 18 positioned below plastic body part 16 and still another plastic body part 20 positioned below plastic body part 18.

The metal body cover plate 14 has a circular passage 22 formed through it. A pair of arms 24 extend horizontally from the metal body cover plate 14 and terminate in a base 26 that is formed perpendicularly to the arms 24. The base 26 has a shaft receiving hole 28 formed through it. A plurality of fastener receiver holes 30 are formed in the metal body cover plate 14.

Figure 6:
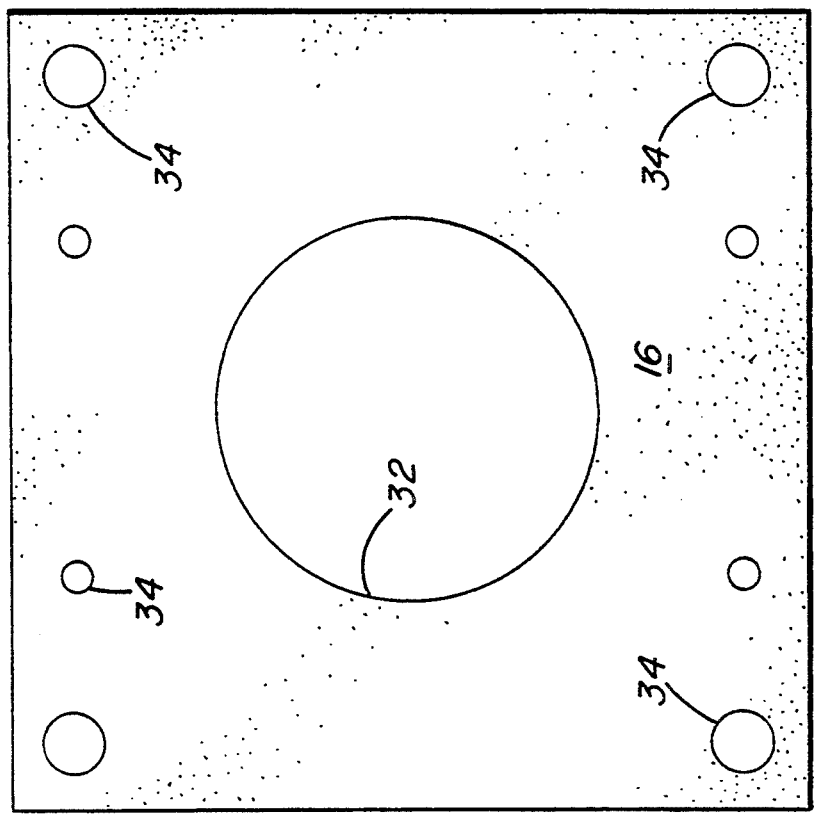
FIG. 6 is a top plan view of a plastic valve body part.
Figure 7:
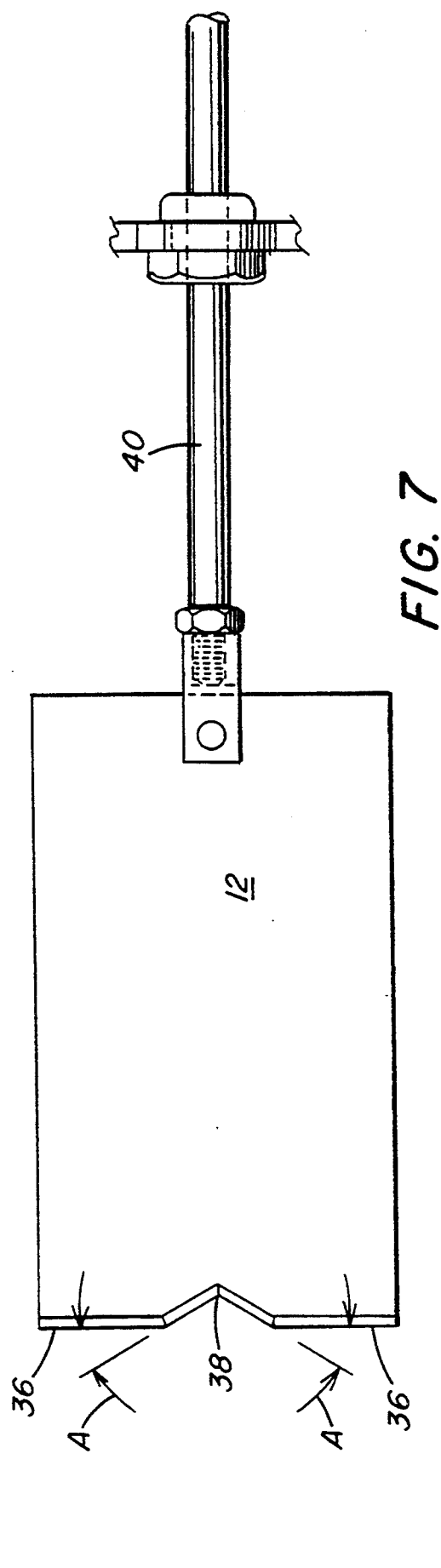
FIG. 7 is a bottom plan view of the metal valve gate of the present invention.

A plastic body part 16 has a circular passage 32 formed through it. Details of plastic body part 16 are shown in FIG. 6. The circular passage 32 in body part 16 is the same size as the circular passage 22 in metal body cover plate 14 and aligns with the circular passage 22 in metal body cover plate 14 when plastic body part 16 is secured to metal body cover plate 14. The plastic body part 16 has a plurality of fastener receiving holes 34 formed in it and the fastener receiving holes 34 of plastic body part 16 align with the fastener receiving holes 30 in metal body cover plate 14.

Figure 8:
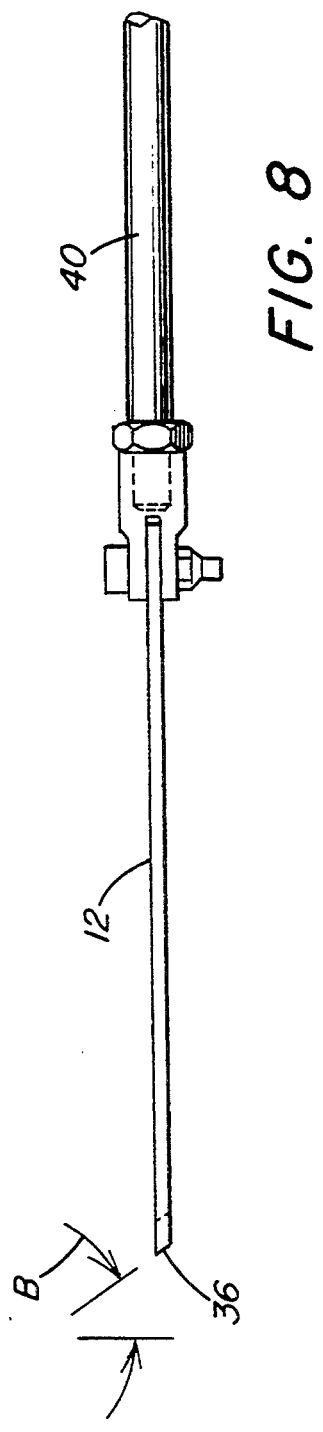
FIG. 8 is a side elevation of the valve gate.

Immediately below plastic body part 16 is positioned the metal valve gate 12 which is surrounded by plastic body part 18. The leading edge 36 of valve gate 12 is angled at an angle B as shown in FIG. 8. Angle B is preferably approximately 15°. A groove 38 is formed in the leading edge 36 of valve gate 12. The sides of groove 38 are at an angle A to the front edge of valve gate 12. The angle A is preferably approximately 30°. The valve gate 12 has a shaft 40 affixed to it whereby shaft 40 can be moved by a valve actuator to move the valve gate 12.

Figure 9:
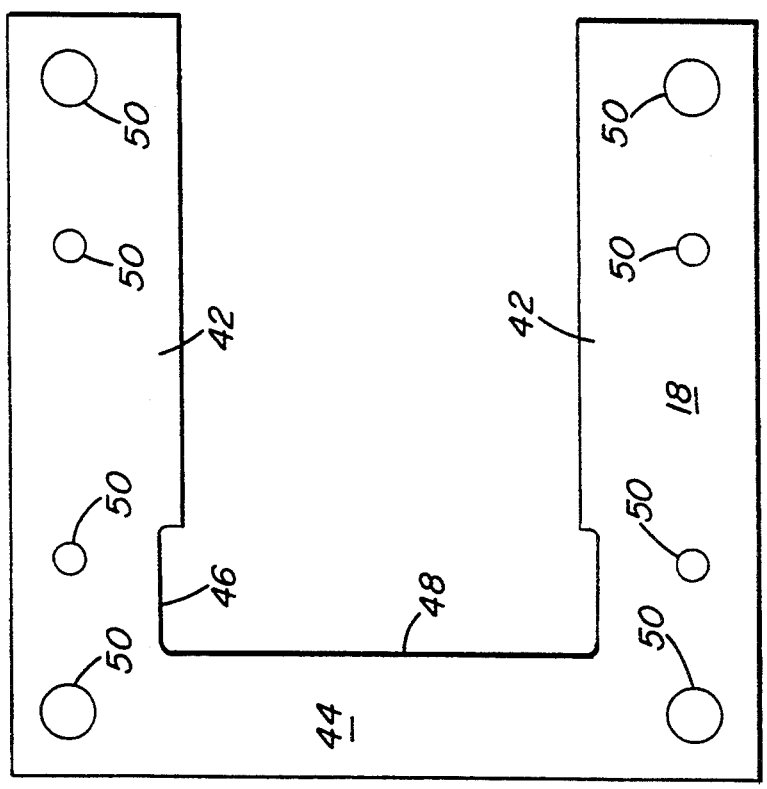
FIG. 9 is a top plan view of a plastic valve body part.

A plastic valve body part 18, details of which are shown in FIG. 9, is positioned adjacent to plastic body part 16 and surrounds the valve gate 12. Legs 42 formed on plastic body part 18 extend rearwardly and in close proximity to the valve gate 12. The legs 42 are joined by cross member 44 of plastic body part 18 and a rectangular recess 46 is formed near the closed end of plastic body part 18. The long dimension of the rectangular recess 46 is shown at 48 and extends transverse to the direction of movement of the valve gate 12 within the plastic body part 18.

A plurality of fastener receiving holes 50 are formed in plastic valve body part 18 and holes 50 align with fastener receiving holes 34 of valve body part 16 and fastener receiving holes 30 of the metal body cover plate 14.

Figure 10:
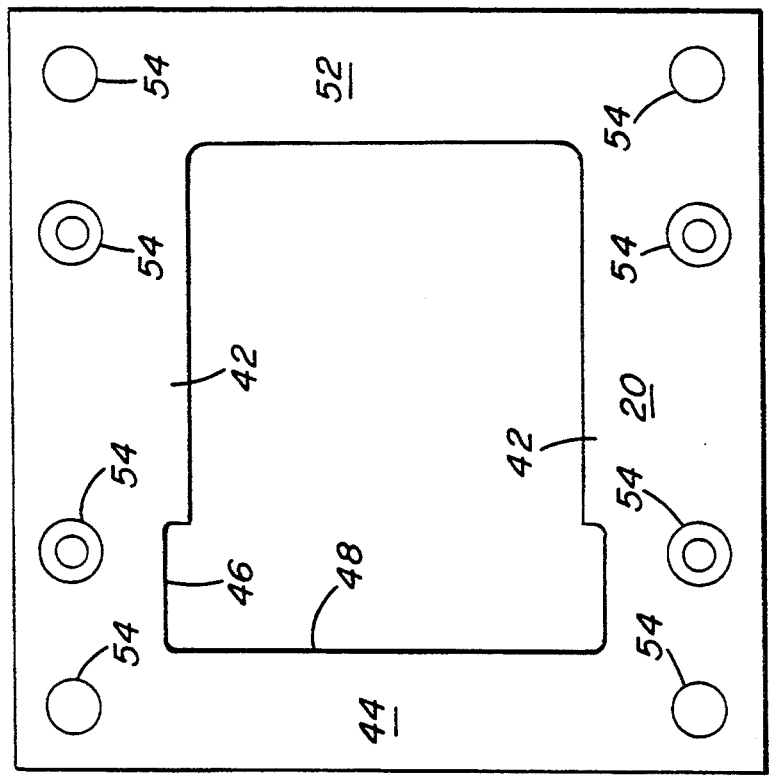
FIG. 10 is a top plan view of a plastic valve body part.

Plastic body part 20, details of which are shown in FIG. 10, abuts plastic body part 18 and is identical in outside shape to plastic body part 18, has the same cross member 44, has the same rectangular recess 46 with the same long dimension 48 of the rectangular recess 46 as does plastic body part 18. In addition, plastic body part 20 has a second cross member 52 which supports the valve gate 12 during the reciprocal movement of valve gate 12 within the valve body. Plastic body part 20 has a plurality of fastener receiving holes 54 that align with the fastener receiving holes 50 of body part 18, the fastener receiving holes 34 of body part 16, and the fastener receiving holes 30 of the metal body cover plate 14. As shown in FIG. 2, fasteners 56, which may be rivets or bolts, join the metal body cover plate 14 and the plastic body parts 16, 18, and 20 securely together to form the valve body.

As seen in FIGS. 2, 3 and 4, the shaft 40 fixed to valve gate 12 extends through the shaft receiving hole 28 in the base 26 of metal body cover plate 14 and is attached to a valve actuator 60 that is also attached to base 26 for providing reciprocating motion to the valve gate 12 within the valve body. Valve actuator 60 may be of any type and forms no part of the present invention. Valve actuator 60 may be manually, electrically, pneumatically or hydraulically actuated. In some instances, the shaft 40 may be fitted with an appropriate handle for manual operation and such a handle is included within the phrase "valve actuator means".

The plastic body parts 16, 18 and 20 of the present invention are preferably formed from a self-lubricating plastic material such as nylon. Other self-lubricating plastic material such as Teflon may also be utilized in appropriate circumstances. The self-lubrication of the plastic permits the metal valve gate 12 to move freely through the valve body from the open position where circular passage 22 permits particulate material to flow therethrough to the closed position wherein valve gate 12 closes off the circular passage 22. The plastic body parts 16, 18 and 20 also promote sealing of the valve gate 12 since they bear against the valve gate 12 when the valve is in the closed position as shown in FIG. 2.

As shown in FIG. 2, the leading edge 36 of valve gate 12 when in the closed position extends beyond the circular passage 22 and into the rectangular recess 46 of plastic body part 18. The groove 38 in the leading edge 36 of valve gate 12 also moves beyond the circular passage 22 when the valve gate 12 is in the closed position as shown in FIG. 2.

The rectangular recess 46 formed in plastic body parts 18 and 20 provides an opening in the lower part of the valve body which permits particulate material to be moved by the valve gate, ahead of the valve gate as the valve gate closes. The angled leading edge 36 of the valve gate operates to move particulate material away from the valve gate 12 as it closes. The groove 38 of valve gate 12 operates to sever any single piece of particulate material that may bridge the space into which valve gate 12 is moving as it moves to the closed position since particulate material will be moved away by the angled leading edge 36 of the valve gate 12 and any remaining particle will be centered into groove 38. It has been found that the valve 10 of the present invention provides a secure and complete shutoff of the flow of particulate material when utilized with plastic pellets both in a containment vessel that is being emptied by gravity and in air or vacuum lines carrying plastic pellets. The air or vacuum lines are also sealed by the valve 10.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. A gate valve for controlling the flow of particulate material comprising:
   a valve body formed from a cover plate and body members fixed to said cover plate, said valve body having a circular passage formed therein;
   a valve gate slidable within said valve body between an open position wherein said circular passage permits movement of said particulate material through said valve and a closed position wherein said valve gate closes said circular passage;
   said valve gate being rectangular and having an angled leading edge with a notch formed at the center of said leading edge; and
   valve actuator means secured to said valve gate and said valve body and being operable to reciprocate said valve gate within said valve body between said open position and said closed position.

2. The gate valve of claim 1 wherein said valve body has an enlarged recess abutting said circular passage to receive particulate material displaced by said valve gate as said valve gate moves to the closed position.

3. The gate valve of claim 2 wherein said valve body is formed by attaching a plurality of said plastic body members to said metal cover plate.

4. The gate valve of claim 2 wherein said enlarged recess is rectangular in shape and its longer dimension is greater than the diameter of said circular recess.

5. The gate valve of claim 4 wherein said enlarged recess is positioned with said longer dimension transverse to the direction of movement of said valve gate as said valve gate opens and closes.

6. The gate valve of claim 1 wherein said notch formed in the leading edge of said valve gate has two intersecting straight edges with each of said edges being at an angle of approximately 30° to said valve gate angled leading edge.

7. A gate valve for controlling the flow of plastic pellets through said gate valve comprising:

a valve body formed from a metal cover plate with a plurality of self-lubricating plastic body members attached to said metal cover plate, said valve body having a circular passage formed therein;

a rectangular valve gate slidable within said valve body between an open position wherein said circular passage permits movement of said pellets through said gate valve and a closed position wherein said valve gate closes said circular passage, said valve gate having an angled leading edge with a notch formed at the center of said leading edge;

said valve body having an enlarged rectangular recess abutting said circular passage with the longer dimension of said rectangular recess transverse to the direction of movement of said valve gate, said enlarged rectangular recess being adapted to receive plastic pellets displaced by said valve gate as said valve gate moves to the closed position; and valve actuator means secured to said rectangular valve gate and to said valve body and being operable to reciprocate said valve gate within said valve body between said open position and said closed position.

8. The gate valve of claim 7 wherein said notch formed in the leading edge of said valve gate has two intersecting straight edges with each of said straight edges being at an angle of approximately 30° to said valve gate angled leading edge, said notch being operable to sever pellets that may block full closure of said circular recess by said valve gate.

9. The gate valve of claim 7 wherein said self-lubricating plastic body members are formed from nylon.

10. The gate valve of claim 7 wherein said self-lubricating plastic body members are formed from Teflon.

* * * * *